United States Patent Office 3,494,857
Patented Feb. 10, 1970

3,494,857
PROCESS FOR THE HYDROGENATION OF
UNSATURATED HYDROCARBONS
Howard G. McIlvried, Pittsburgh, and Raynor T.
Sebulsky, Verona, Pa., assignors to Gulf Research
& Development Company, Pittsburgh, Pa., a corporation of Delaware
No Drawing. Continuation-in-part of application Ser. No. 650,230, June 30, 1967. This application May 10, 1968, Ser. No. 728,307
Int. Cl. C10g 23/02, 37/00
U.S. Cl. 208—143                    5 Claims

ABSTRACT OF THE DISCLOSURE

The catalytic hydrogenation of a highly unsaturated liquid fraction obtained from the thermal cracking of a hydrocarbon material in the presence of at least one Group VIII iron group metal and optionally at least one Group VI-B metal on an alkali metal promoted alumina or silica-alumina support.

---

This is a continuation-in-part of Ser. No. 650,230 filed on June 30, 1967, and now abandoned.

This invention relates to an improved process for the catalytic hydrogenation of a highly unsaturated liquid fraction resulting from the thermal cracking of a hydrocarbon material.

In the thermal cracking of ethane or ethane-propane mixtures at high temperatures to produce ethylene, about 2 to 15 percent of the feed is converted to a fraction of higher hydrocarbons. After debutanizing this fraction of higher hydrocarbons, a normally liquid fraction is obtained having an end point up to about 450° F. or more the end point depending in part on the cracking conditions employed. This liquid fraction contains a great variety of molecular species including a high proportion of unsaturated compound such as aliphatic and cyclic mono-, di- and triolefins, acetylenes, aryl alkenes such as styrenes, minor quantities of unsaturated sulfur and nitrogen containing compounds, etc., as well as large amounts of aromatics, such as benzene, toluene and xylenes which are valuable as high octane gasoline components or as petrochemicals.

This liquid fraction has a high gum-forming tendency because many of the unsaturated compounds which it contains are very reactive and tend to form undesired polymers. Therefore, in order to utilize this liquid fraction or any portion of it, for example, as a constituent of motor fuels, it is usually necessary to hydrogenate the more reactive species present. Furthermore, if it is desired to recover the aromatics in this liquid fraction by solvent extraction, it is desirable to first hydrogenate all of the olefinic materials present to prevent them from interfering with the desired separation. In hydrogenating this highly unsaturated liquid fraction or portions thereof over a fixed bed of catalyst, great difficulty has been encountered due to extensive catalyst deposits and plugging of the hydrogenation catalyst resulting in short catalyst life and excessive hydrogenation unit downtimes for catalyst regeneration. These deposits are believed to involve the highly reactive unsaturated compounds, but due to their great variety and complexity, the nature of the deposit forming reactions is not fully understood.

In a similar manner naphtha feeds are thermally cracked to produce ethylene and this operation also produces a liquid by-product high in unsaturates which presents a similar deposit-forming problem in hydrogenation attempts. Additionally, similar liquid by-product material, rich in unsaturates, is produced in the severe thermal cracking of other hydrocarbon fractions including, furnace oil fractions, gas oil fractions, whole crudes and mixed feeds. In order to hydrogenate these unsaturate-rich liquid materials it has been proposed to use a hydrogenation catalyst on a non-cracking support such as alumina, silica, steam deactivated silica-alumina, magnesia and the like. Although of satisfactory hydrogenation activity, these catalysts all suffer in that in use they are quickly plugged with extensive amounts of deposits.

We have made the surprising discovery that if an alumina or silica-alumina support is promoted with an alkali metal and if the metallic hydrogenation component is one or more iron group metals optionally with one or more Group VI-B metals, the amount of these carbonaceous deposits on the catalyst is significantly reduced without appreciably affecting the hydrogenation activity of the catalyst. The preferred alkali metal promoter is sodium with potassium, lithium and the others less preferred in that order. The alkali metal can be incorporated in the calcined support prior to the addition of the hydrogenation components; however, it can also be added with or after the hydrogenation compents. An alternative procedure involves the incorporation of the alkali metal in the support before it is calcined. Any alkali metal compound may be used which is soluble in water or an organic solvent treating solution such as ethyl alcohol and which is decomposable by reaction upon calcination. Examples of suitable alkali metal compounds include the hydroxide, nitrate, carbonate, bicarbonate, acetate, oxalate, citrate, etc. The function of the alkali metal in the catalyst and its participation in the hydrogenation reaction is not understood. As data herein indicate, the surface acidity of the catalyst is reduced; however, the low deposit forming characteristic of this alkali metal promoted catalyst does not appear to be a function of the surface acidity since the worst catalyst, i.e. the one having the highest deposit forming characteristics, is also the least acid. The alkali metal in the finished catalyst will amount to from about 0.1 percent to about 5 percent of the total catalyst weight in the broader range and about 0.4 percent to about 2.5 percent in the preferred range.

Due to the extreme reactivity of many of the unsaturated components in the feed material, mild hydrogenation conditions are preferred. A reaction temperature between about 300° F. and about 650° F. can be used and it is preferred to use a reaction temperature between about 350° F. and 600° F. The space velocity of the charge material measured as volumes of normally liquid feed per volume of catalyst per hour can be between about 0.1 and 10 or more and preferably between about 1 and 4. Space velocity, reaction temperature and pressure are correlated to obtain the desired degree of saturation. In general, increasing the reaction temperature or pressure or decreasing the space velocity increases the degree of hydrogenation.

At the milder conditions of operation, aliphatic and cyclic monoolefins do not readily hydrogenate, while benzene rings require still more rigorous conditions for hydrogenation than these monoolefins. Hydrogenation conditions are frequently chosen which will result primarily in the saturation of the more reactive compounds present in the feed such as the acetylenes, di- and triolefins, cyclic diolefins, aryl alkenes, etc. However, it is often desirable to select conditions which will, in addition, effect the saturation of the less reactive olefinic species such as the aliphatic and cyclic monoolefins. Usually it is not desired to saturate aromatic rings and the conditions in this event will therefore be selected such that benzene, toluene, xylenes and the like remain substantially unaffected.

The partial pressure of hydrogen in the reaction mixture can be between about 200 and about 1,200 p.s.i.a. and preferably between about 330 and about 800 p.s.i.a. Higher hydrogen partial pressures may be employed, but such is not particularly advantageous and may lead to undesired saturation of the aromatic rings present in the feed. The feed rate of hydrogen can be between about 1,500 and 10,000 s.c.f./bbl. or more with preferred amounts being between about 3,000 and 7,000 s.c.f./bbl. Hydrogen purity can be between 30 and 100 percent; however, it is preferred that the hydrogen stream be at least 50 percent hydrogen. Since hydrogen is ordinarily recycled, the desired purity can be maintained by bleeding off a portion of the recycle stream and using make-up hydrogen from a high purity hydrogen source.

The hydrogenation of these unsaturated compounds is highly exothermic. When a high percentage of unsaturated compounds, particularly dienes, polyenes and acetylenes, is present, the reaction temperature becomes difficult to control. Excessive temperatures may result in extensive undesired polymerization of the charge compounds. In order to better control temperature levels it is frequently desirable to dilute the charge stock with a relatively inert hydrocarbon stream to function as a heat sink. This diluting stream can be a straight run naphtha fraction, furnace oil or similar stream or it can be a partial recycle of the hydrogenated product. Suitable substantially non-reactive constituents of the diluting stream include paraffins, naphthenes, aliphatic and cyclic monoolefins, and aromatics without a significant amount of vinyl substituents. The diluent can be added in sufficient amount to limit the unsaturated compounds other than aliphatic and cyclic monoolefins and aromatic compounds without unsaturated side chains to from about 5 to 60 weight percent of the total charge stream.

At least one Group VIII iron group metal, that is nickel, cobalt and iron, can be employed as the metallic hydrogenation component in our catalyst. Additionally, one or more Group VI–B metals, that is chromium, molybdenum and tungsten, can be used in combination with one or more of the iron group metals. A preferred catalyst comprises at least one Group VI–B metal, such as molybdenum or tungsten with at least one iron group metal, such as cobalt or nickel. The most preferred catalyst comprises at least one Group VI–B metal, such as molybdenum, with at least two iron group metals, such as nickel and cobalt.

When one or more iron group metals are used as the hydrogenation component, the metallic hydrogenation component preferably comprises as the metal between about 0.5 and about 40 weight percent of the catalyst and more preferably between about 1.0 and about 15 weight percent. When one or more Group VI–B metals are used in combination with one or more iron group metals, the Group VI–B metals preferably comprise between about 0.5 and about 40 weight percent of the catalyst and more preferably between about 5 and about 20 weight percent and the iron group metals preferably comprise between about 0.2 and about 20 weight percent of the catalyst and more preferably between about 0.5 and about 5 weight percent.

The preferred iron group metal hydrogenation catalysts are nickel and cobalt and the preferred Group VI–B metals for inclusion with one or more iron group metals are molybdenum and tungsten. The preferred combined catalyst comprises as the metal about 0.5 to about 20.0 weight percent and preferably about 5.0 to about 15.0 weight percent molybdenum, about 0.5 to about 20.0 weight percent and preferably about 1.0 to about 5.0 weight percent nickel and about 0.5 to about 20.0 weight percent and preferably about 1.0 to about 5.0 weight percent cobalt. Other effective combined catalysts include a combination of nickel and molybdenum, cobalt and molybenum, nickel and tungsten, nickel and cobalt, etc.

The catalyst can be prepared by any conventional technique. In one procedure the support is impregnated with a solution, usually aqueous, of a soluble compound of the metal or metals being deposited; then, it is filtered, dried and calcined to convert each metal compound to the metal oxide. It is preferred to utilize compounds of the metals which will decompose upon calcination to yield the oxide of the metal. When more than one metal is included in the catalyst composition, the support can be sequentially impregnated with separate solutions of each metal with calcination following each impregnation or by the impregnation of the support with a solution containing all of the metallic hydrogenation components. The alkali metal compound can be incorporated in the support by impregnation before the metals are incorporated in the support or concurrently with the metals or after the metals have been incorporated in the support. An alternative procedure involves the precipitation of the active hydrogenation components on a preformed support. Additionally, the catalyst can be made by a mix-mull technique in which the metal salts and the support are mixed with sufficient liquid to form a pasty mass prior to forming and calcining. Calcining is usually accomplished by heating in air to a temperature of about 800° to 1200° F. for an appropriate period of time. The preferred support is an alumina or less preferably a silica-alumina, either of which is alkali metal promoted as described.

It is preferred to charge the catalyst to the reactor with the metallic hydrogenation components in the form of the metal oxides. In use the hydrogenation components will normally be partially or totally reduced. However, the sulfide form of the metals or mixed oxide-sulfide forms can also be used. If the sulfide of the metal is desired, this can readily be accomplished in a conventional manner by reacting the catalyst containing the metal oxides of the hydrogenation components with hydrogen sulfide, preferably diluted with hydrogen.

The catalyst can be placed in the hydrogenation tower as one bed or as two or more discrete beds. Multi-bed operation is frequently advantageous because it permits the cooling of the reactant stream between the beds for better temperature control. In the hydrogenation tower either downflow or upflow operation can be utilized.

The invention will be further described with reference to the following specific examples.

EXAMPLE 1

A sodium modified alumina hydrogenation catalyst was prepared in the following manner. To 218 grams of a commercially available alumina were added 7.70 grams of sodium nitrate, $NaNO_3$, dissolved in 147 grams of distilled water. This quantity of solution is just sufficient to bring the alumina to incipient wetness. The sodium nitrate impregnated alumina was calcined at 1000° F. for 16 hours.

Next 176 grams of an ammoniated aqueous solution of ammonium paramolybdate was prepared by adding 25 cc. of concentrated (28%) ammonia to 56.8 grams of $(NH_4)_6Mo_7O_{24} \cdot 4H_2O$ and diluting to the indicated weight with distilled water. The sodium modified alumina support was impregnated with this solution and oven-dried at 250° F. The oven-dried support was then impregnated with 131 grams of an aqueous solution of 17.3 grams of cobalt nitrate, $Co(NO_3)_2 \cdot 6H_2O$, and 32.0 grams of nickel nitrate, $Ni(NO_3)_2 \cdot 6H_2O$. This composite catalyst was calcined at 1000° F. for 16 hours. Physical properties of the catalyst are shown in Table I as catalyst A. In like manner a catalyst similar to catalyst A, identified as catalyst B in Table I, was prepared without sodium inclusion. Another catalyst similar to catalyst A, identified as catalyst C, was prepared without added sodium or molybdenum but with the same total metals content as in catalysts A and B. The same commercial alumina was used in preparing catalysts A, B and C.

EXAMPLE 2

A hydrogenation catalyst with low acidic character was prepared with 83.5 grams of a commercial silica gel. To this silica gel was added 132 grams of an ammonium paramolybdate solution prepared from 21.4 grams of $(NH_4)_6Mo_7O_{24} \cdot 4H_2O$, 9.4 cc. of concentrated (28%) ammonia and distilled water. The molybdenum impregnated catalyst was dried at 250$ F. Subsequent to over drying, cobalt and nickel were added to the catalyst by impregnation with 117 grams of aqueous solution containing 6.53 grams of cobalt nitrate $Co(NO_3)_{22} \cdot 6H_2O$, and 12.10 grams of nickel nitrate, $Ni(NO_3)_2 \cdot 6H_2O$. The catalyst was then calcined at 1000° F. for 16 hours. Physical properties of this catalyst are also shown in Table I under the heading catalyst D.

TABLE I.—CATALYST INSPECTIONS

| | Catalyst | | | |
|---|---|---|---|---|
| | A | B | C | D |
| | Base | | | |
| | Na Promoted Alumina | Alumina | Alumina | Silica Gel |
| Analysis, wt. percent: | | | | |
| Ni | 2.5 | 2.3 | 11.0 | 2.3 |
| Co | 1.3 | 1.2 | 1.3 | 1.2 |
| Mo | 10.7 | 11.0 | 0 | 11.7 |
| Na | 0.75 | | | |
| Surface Area, M.²/gm | 164 | 313 | 174 | 223 |
| Surface Acidity, cc. STP NH₃/gm. at 172° C | 9.44 | 13.85 | 10.19 | 6.93 |

EXAMPLE 3

A composite stock was made up using 35 volume percent of a debutanized light liquid by-product fraction from the thermal cracking of ethane to ethylene, the inspections of which are set forth under X in Table II below; 15 volume percent of a heavy liquid by-product fraction from the thermal cracking of ethane to ethylene, the inspections of which are set forth under Y in Table II; and 50 volume percent of a heavy West Texas furnace oil, the inspections of which are set forth under Z in Table II. The furnace oil was employed as an essentially inert diluent in the charge stock.

TABLE II

| Component | X | Y | Z |
|---|---|---|---|
| Volume percent | 35 | 15 | 50 |
| Gravity, °API | 37.9 | 19.6 | 32.5 |
| Bromine Number | 42 | 124 | 2.0 |
| Existent Gum, mg./100 Ml | | 191 | 2 |
| Potential Gum, Mg./100 Ml | | 13,440 | |
| Hydrocarbon Type, percent by Vol. (Mass Spectrometry—Saturate-Free Basis): | | | |
| Monoolefins | 8 | 0 | |
| Cycloolefins/Diolefins | 9 | 1 | |
| Cyclodiolefins | 6 | 37 | |
| Indanes/Styrenes/Dicyclopentadiene | 2 | 35 | |
| Benzene | 59 | 0 | |
| Toluene | 13 | 0 | |
| C₈ Alkylbenzenes | 3 | 12 | |
| C₉ Alkylbenzenes | 0 | 7 | |
| C₁₀ Alkylbenzenes | 0 | 1 | |
| Indene | 0 | 6 | |
| Naphthalene | 0 | 1 | |
| Distillation, ASTM D 86, °F.: | | | |
| Over Point | 127 | | 449 |
| 10% | 164 | 307 | 511 |
| 50% | 186 | 319 | 551 |
| 90% | 224 | 353 | 598 |
| End Point | 284 | 423 | 632 |
| Hydrocarbon Type, Percent by Vol. (FIA Analysis): | | | |
| Aromatics | 98.5 | 100.0 | 33.5 |
| Olefins | | | 1.5 |
| Saturates | 1.5 | 0.0 | 65.0 |

EXAMPLE 4

Separate samples of the charge stock of Example 3 were hydrogenated under identical conditions over catalysts A, B, C and D of Examples 1 and 2. The runs were made in a unit employing 100 cc. of catalyst in a nominally one-inch I.D. reactor. The catalyst was split into three beds of 20 cc., 40 cc. and 40 cc. from top to bottom which were separated by quartz chips. This facilitated temperature control and made it possible to sample used catalyst at different positions. Operation of the reactor was downflow.

Each run was for a total period of 48 hours. In each run the charge stock temperature was 450° F. at the reactor inlet, the pressure in the reactor was 650 p.s.i.g., 2,200 s.c.f. of hydrogen/bbl. was used, and a liquid hourly space velocity of 2.0 was employed. The operation was close to isothermal with the outlet temperature never exceeding 510° F. The catalysts were presulfided at 650° F. and atmospheric pressure with a 90:10 mole ratio mixture of $H_2$ and $H_2S$. The hydrogenated product for the periods 8 to 16 hours, 24 to 32 hours and 40 to 48 hours of operation was distilled to separate the lighter fraction from the diluent plus gums fraction and these fractions were analyzed. This analysis is set forth in Table III. Each catalyst was analyzed for carbon at the completion of the runs and this analysis is also set forth in Table III. The composite charge stock possessed a bromine number of 57.7, an existent gum value of 7.0, 0.011 weight percent nitrogen and 1.00 weight percent sulfur.

TABLE III.—48-HOUR HYDROGENATION TESTS

| Catalyst | A | | | B | | | C | | | D | | |
|---|---|---|---|---|---|---|---|---|---|---|---|---|
| Base | Na Promoted Alumina | | | Alumina | | | Alumina | | | Silica Gel | | |
| Period, hours | 8-16 | 24-32 | 40-48 | 8-16 | 24-32 | 40-48 | 8-16 | 24-32 | 40-48 | 8-16 | 24-32 | 40-48 |
| Distillate: | | | | | | | | | | | | |
| Bromine Number | 16.3 | 21.0 | 22.0 | 18.3 | 15.8 | 15.7 | 41.1 | 45.3 | 40.0 | 34.3 | 39.9 | 36.7 |
| Average ᵃ | | 19.8 | | | 16.6 | | | 42.1 | | | 37.0 | |
| Diluent: | | | | | | | | | | | | |
| Existent Gum (mg./100 ml.) | 512 | 783 | 718 | 442 | 534 | 529 | 904 | 1,083 | 1,062 | 787 | 1,285 | 1,290 |
| Average ᵃ | | 671 | | | 501 | | | 1,016 | | | 1,121 | |
| Nitrogen (wt. percent) | 0.007 | 0.006 | 0.007 | 0.004 | 0.010 | 0.006 | 0.009 | 0.009 | 0.006 | 0.011 | 0.013 | 0.014 |
| Sulfur (wt. percent) | 0.72 | 0.74 | 0.71 | 0.60 | 0.68 | 0.63 | 0.87 | 0.80 | 0.79 | 0.84 | 0.80 | 0.80 |
| Carbon on Catalyst (wt. percent): | | | | | | | | | | | | |
| Top Bed | | 4.95 | | | 17.03 | | | 10.64 | | | 28.20 | |
| Middle Bed | | 4.95 | | | 13.86 | | | 7.54 | | | 20.85 | |
| Bottom Bed | | 4.51 | | | 14.28 | | | 7.73 | | | 20.92 | |
| Average | | 4.80 | | | 15.05 | | | 8.64 | | | 26.66 | |

ᵃ Average for the three periods, 8-16 hours, 24-32 hours and 40-48 hours.

From Table III it is noted that catalyst A is almost as active for hydrogenation as catalyst B in reducing the bromine number of the charge from 57.7 to an average bromine number of 19.8 compared with an average bromine number of 16.6 for catalyst B. This indicates that the substantial reduction in surface area in catalyst A, resulting from its preparation, is not significant.

However, catalyst A resulted in a striking reduction in the catalyst deposit showing an average of 4.80 percent carbon compared with an average of 15.05 percent for catalyst B. Thus it is seen that catalyst A results in a striking improvement in the amount of catalyst deposit with little sacrifice in hydrogenation activity. It is interesting to note that use of catalyst A increased the amount of non-deposited gum recovered from the diluent, which had an average of 671 mg./100 ml., compared with an average of 501 mg./100 ml. of non-deposited gum recovered from the diluent used with catalyst B. This would indicate that catalyst A tends to inhibit the deposition of gum on the catalyst rather than inhibit its formation. Since gum is a measure of the extent to which polymerization has taken place, it is apparent that suppression of polymerization is not the explanation of the low deposit level on the sodium modified catalyst.

Both catalysts C and D are highly inferior in activity as determined by the bromine number. On deposit characteristics catalyst C with an average of 8.64 percent carbon comes in between catalysts A and B, while catalyst D with an average of 26.66 percent is highly inferior to the other three catalysts in this regard. Also the gum occurring in the diluent is significantly higher with catalysts C and D than with the other two catalysts showing an average of 1016 mg./100 ml. and 1121 mg./100 ml. respectively.

EXAMPLE 5

In another series of runs in a pilot plant under identical conditions, catalyst A and catalyst B were separately used to hydrogenate similar, but not identical, liquid by-product charge stocks obtained from the thermal cracking of ethane. For example, a charge stock used with catalyst A contained a total of 21 volume percent cycloolefins, diolefins, cyclodiolefins, styrenes, indanes and dicyclodiolefins while a charge stock used with catalyst B contained only 11 volume percent of these highly reactive components. The run using catalyst B had to be terminated after 22 days due to catalyst plugging as the result of extensive deposits. On the other hand, the run using catalyst A was voluntarily terminated after 55 days without significant plugging of the catalyst despite the significantly higher proportion of the highly reactive materials in the feed stream.

It is preferred that the diluent material be relatively inert at the conditions in which hydrogenation occurs. When the hydrogenation is conducted for the hydrogenation of the more highly reactive species only, any aliphatic and cyclic monoolefins contained in the diluent hydrocarbon will go through the reaction zone relatively unaffected. If the hydrogenation is conducted with sufficient severity to saturate the aliphatic and cyclic monoolefins, for example, when the unsaturated liquid fraction is to be subjected to solvent extraction for recovery of the aromatic compounds, it is preferred that the diluent does not contain a significant amount of these cyclic and aliphatic monoolefins. However, this is ordinarily not a factor since the more preferred diluent material such as kerosene, furnace oil, recycled product and the like, is naturally low in these monoolefins.

It is to be understood that the above disclosure is by way of specific example and that numerous modifications and variations are available to those of ordinary skill in the art without departing from the true spirit and scope of our invention.

We claim:

1. An improved process for the substantially complete hydrogenation of all non-aromatic hydrocarbons in the debutanized liquid fraction from the thermal cracking of a hydrocarbon material having at least 2 carbon atoms at hydrogenation conditions of temperature and pressure, the improvement which comprises hydrogenating said fraction at conditions for the substantially complete saturation of all non-aromatic hydrocarbons in the presence of a partially deactivated catalyst comprising at least one Group VI–B metal hydrogenation component selected from molybdenum and tungsten and at least one iron group metal selected from nickel and cobalt and their oxides and sulfides on a base selected from alumina and silica-alumina, said catalyst partially deactivated by deposition thereon of an alkali metal in the amount of about 0.1 percent to about 5.0 percent by weight of the catalyst, whereby substantially all non-aromatic hydrocarbons are saturated and the deposition of gum and carbonaceous deposits onto said catalyst is inhibited.

2. The improved process in accordance with claim 1 in which the hydrocarbon material is selected from the group consisting of hydrocarbons having between 2 and 4 carbon atoms per molecule, naphtha fractions, furnace oil fractions, gas oil fractions, crude petroleums and mixtures thereof.

3. The improved process in accordance with claim 2 in which the alkali metal is present in the amount of about 0.4 percent to about 2.5 percent and the base is alumina.

4. The improved process in accordance with claim 3 in which the alkali metal is selected from sodium and potassium.

5. The improved process in accordance with claim 4 in which said metallic hydrogenation component comprises nickel, cobalt and molybdenum.

References Cited

UNITED STATES PATENTS

| | | | |
|---|---|---|---|
| 3,016,347 | 11/1962 | O'Hara | 208—143 |
| 3,094,481 | 6/1963 | Butler et al. | 208—143 |
| 3,211,669 | 10/1965 | Univerferth | 208—143 |
| 3,258,431 | 6/1966 | Fisher et al. | 208—143 |
| 3,309,421 | 3/1967 | Kirk et al. | 208—143 |
| 3,328,477 | 6/1967 | Taylor et al. | 208—143 |

HERBERT LEVINE, Primary Examiner

U.S. Cl. X.R.

208—67, 144